No. 717,037. Patented Dec. 30, 1902.
H. SIELING.
STEAM COOKING APPARATUS.
(Application filed Apr. 17, 1902.)
(No Model.)

Witnesses.
Hans Brunner
Willi Kaeper.

Inventor.
Heinrich Sieling
per Gerson & Sachse
Attorneys.

UNITED STATES PATENT OFFICE.

HEINRICH SIELING, OF HÜLLEN, GERMANY.

STEAM COOKING APPARATUS.

SPECIFICATION forming part of Letters Patent No. 717,037, dated December 30, 1902.

Application filed April 17, 1902. Serial No. 103,470. (No model.)

*To all whom it may concern:*

Be it known that I, HEINRICH SIELING, a subject of the Emperor of Germany, and a resident of Hüllen, near Gelsenkirchen, German Empire, have invented certain Improvements in Steam Cooking Apparatus, of which the following is a specification.

My invention relates to steam cooking apparatus, and has for its object to provide therefor an automatic water-supply for preventing the food cooked in such apparatus from burning.

The accompanying drawings illustrate the invention.

Figure 1:
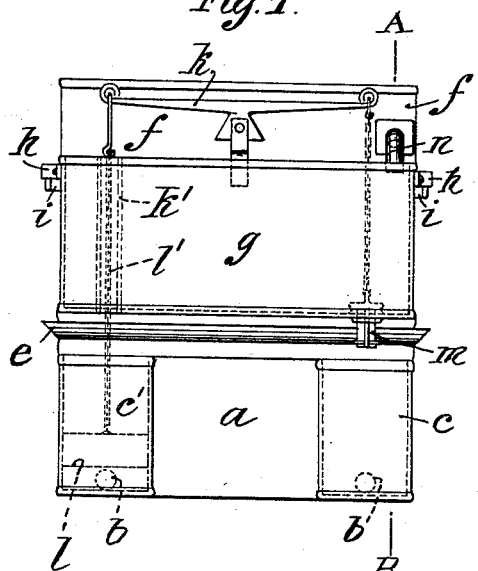
Figure 2:
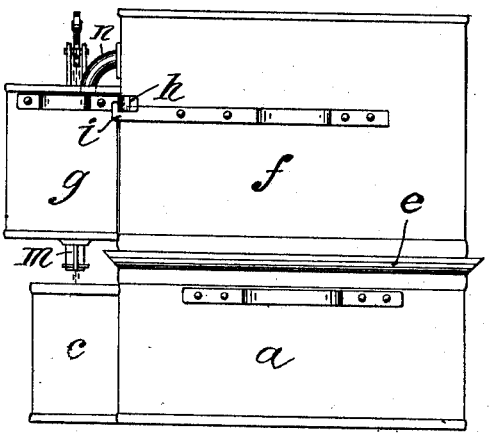
Figure 3:
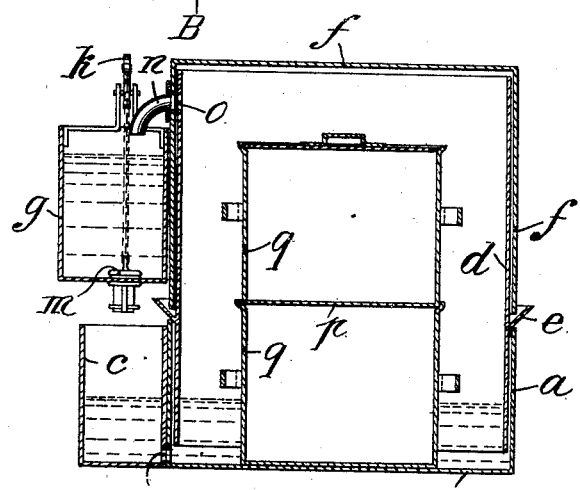

Figure 1 shows a front elevation of an apparatus with my improvements. Fig. 2 is a side view of Fig. 1. Fig. 3 is a vertical section on the line A B of Fig. 1.

In the construction of my invention I employ a quadrangular vessel $a$, which has the two open compartments $c$ and $c'$, secured to its front side, communicating with the vessel $a$ through holes $b$. A quadrangular casing $d$, fitting into the vessel $a$ and being open at both its upper and lower ends, is placed into said vessel and rests on the upper edge thereof by means of its flange $e$. Over this casing I place a suitably-shaped cover $f$, which has likewise the form of a quadrangular casing and rests with the lower edges of its walls on the flange $e$, surrounding the casing $d$. This cover $f$ has on its front, throughout the length thereof, a water-tank $g$, which by means of the hook-shaped extensions $h$ of its handles is suspended on likewise hook-shaped arms $i$, secured to the sides of cover $f$ and extending therefrom, so as to receive the hooks $h$. A double-armed lever $k$ is pivotally mounted over the middle of tank $g$, which lever at its one end supports a float $l$, suspended therefrom by means of a chain $l'$, which latter is guided within a vertical pipe $k'$, extending from a suitable hole in the bottom of tank $g$, and thus supports the float within the compartment $c'$. The other end of said lever $k$ has a valve $m$ suspended therefrom, which valve controls the water-outlet in the bottom of tank $g$, above the compartment $c$. A small curved pipe $n$, entering the cover $f$, strictly before a hole $o$ in casing $d$, terminates against the water-surface and is adapted to conduct the steam out of the vessel against said water, so as to heat same.

The operation of my invention is as follows: The boiling-pots $q$ $q$, containing the food, are placed one on each other into the vessel $a$ and casing $d$, which latter is then covered with the casing $f$. Now a suitable amount of water is poured into the vessel through the compartment $c$ or $c'$, and finally a water-tank $g$ is placed in position on the hooks $h$, and the chain $l'$, supporting the float $l$ within compartment $c'$, is adjusted in length. It will be clear that several pots $q$ may be superposed on each other in the vessel $a$ and casing $d$, whereby the cover $f$ is lifted more or less on the casing $d$, and therefore the chain $l'$ requires adjustment in length. Thus prepared the apparatus is placed on a fire and the steam generated in the vessel will soon heat the food within the pots $q$. When the level of the water sinks within the compartment $c'$, the lowered float $l$ lifts the valve $m$, and thus operates the water-supply from tank $g$ into the compartment $c$, communicating with the vessel $a$, as above described.

Having now described my invention, I claim—

In an improvement in steam cooking apparatus, the combination of a vessel, two outer compartments communicating therewith, a casing fitting into said vessel and resting on the upper edge thereof by means of a flange, a cover fitting over said casing, a water-tank connected to said cover over said compartments, a double-armed lever mounted over the middle of said tank, a pipe extending from a hole in the bottom of said tank above one of the said compartments, an adjustable chain depending through said pipe into said compartment, a float in the latter fastened to said chain and a valve suspended on the other end of said lever and controlling the water-outlet in the bottom of said tank above said other compartment, substantially as described,

HEINRICH SIELING.

Witnesses:
 WILLIAM ESSENWEIN,
 P. LIEBER.